(12) United States Patent
Wassarman et al.

(10) Patent No.: US 10,078,030 B2
(45) Date of Patent: Sep. 18, 2018

(54) LIQUID DETECTION SYSTEM

(71) Applicant: WASSARMAN, INC., Austin, TX (US)

(72) Inventors: Dana Wassarman, Austin, TX (US); Sebastien Weyland, Austin, TX (US)

(73) Assignee: Wassarman, Inc., Austin, TX (US)

( * ) Notice: Subject to any disclaimer, the term of this patent is extended or adjusted under 35 U.S.C. 154(b) by 0 days.

(21) Appl. No.: 15/410,076

(22) Filed: Jan. 19, 2017

(65) Prior Publication Data

US 2017/0205308 A1  Jul. 20, 2017

Related U.S. Application Data

(60) Provisional application No. 62/280,256, filed on Jan. 19, 2016.

(51) Int. Cl.

| *G01M 3/16* | (2006.01) |
|---|---|
| *E04D 13/00* | (2006.01) |
| *E04B 1/66* | (2006.01) |
| *E04B 1/92* | (2006.01) |

(52) U.S. Cl.
CPC .......... *G01M 3/16* (2013.01); *E04B 1/66* (2013.01); *E04B 1/92* (2013.01); *E04D 13/006* (2013.01)

(58) Field of Classification Search
CPC .... G01M 3/16; E04B 1/66; E04B 1/92; E04D 13/006

USPC ... 324/600, 694, 500, 514, 754.04, 452–453
See application file for complete search history.

(56) References Cited

U.S. PATENT DOCUMENTS

| 4,719,407 A | * | 1/1988 | Converse | ............... | G01R 27/14 324/559 |
| 4,947,470 A | * | 8/1990 | Darilek | ................... | G01M 3/40 324/326 |
| 5,537,095 A | * | 7/1996 | Dick | ......................... | A61F 5/48 128/886 |

* cited by examiner

*Primary Examiner* — Melissa Koval
*Assistant Examiner* — Trung Nguyen
(74) *Attorney, Agent, or Firm* — James C. Willson; Hunton Andrews Kurth LLP

(57) ABSTRACT

Embodiments of the described system are related to detecting and locating liquids. The system comprises at least one sensor tile, wherein each sensor tile includes a first plurality of conductive lines attached to a first side of a substrate and a second plurality of lines attached to a second side of a substrate. In a preferred embodiment, the first plurality of conductive lines is arranged to be offset 90 degrees with respect to the second plurality of conductive lines. The system also contains at least one processor operably connected to the first and second plurality of conductive lines by at least two multiplexer pieces. The sensor tiles, multiplexer pieces, and processor are interconnected by conductive connectors.

3 Claims, 7 Drawing Sheets

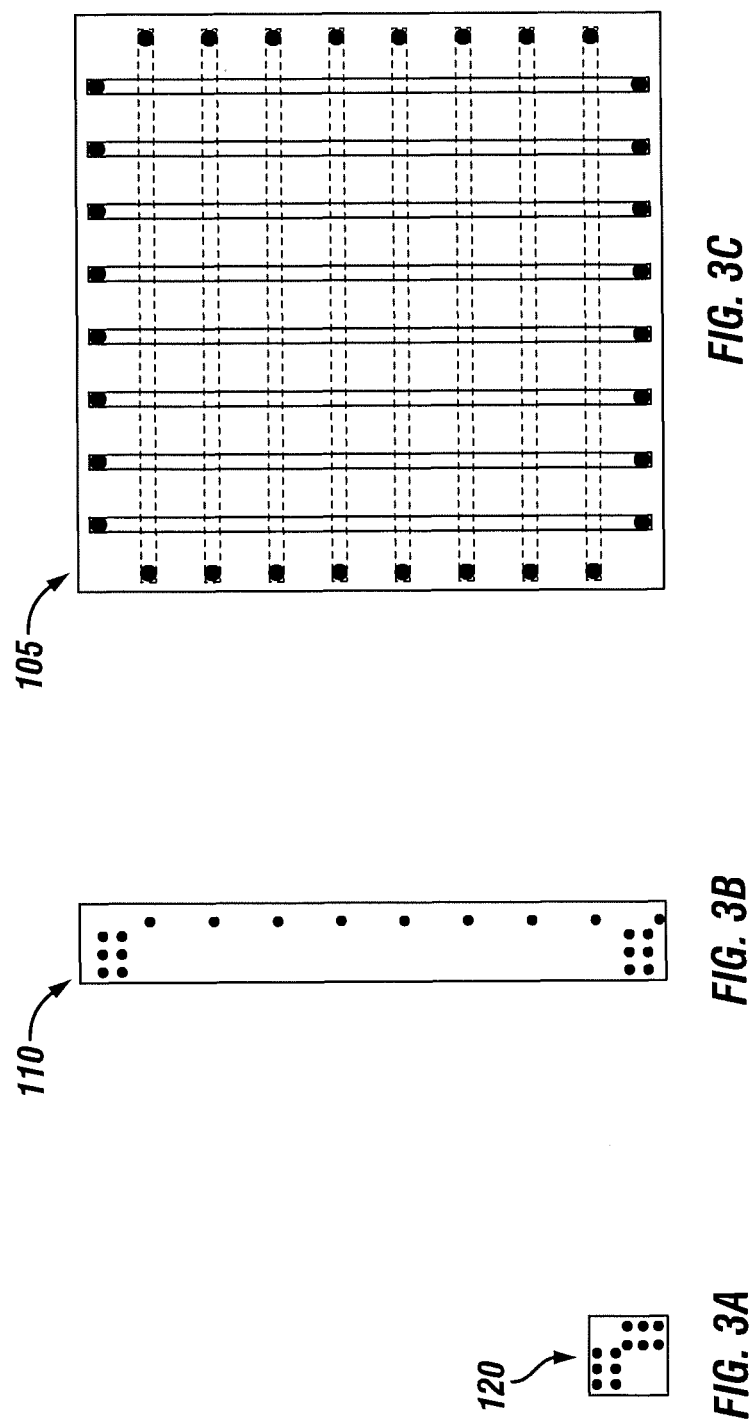

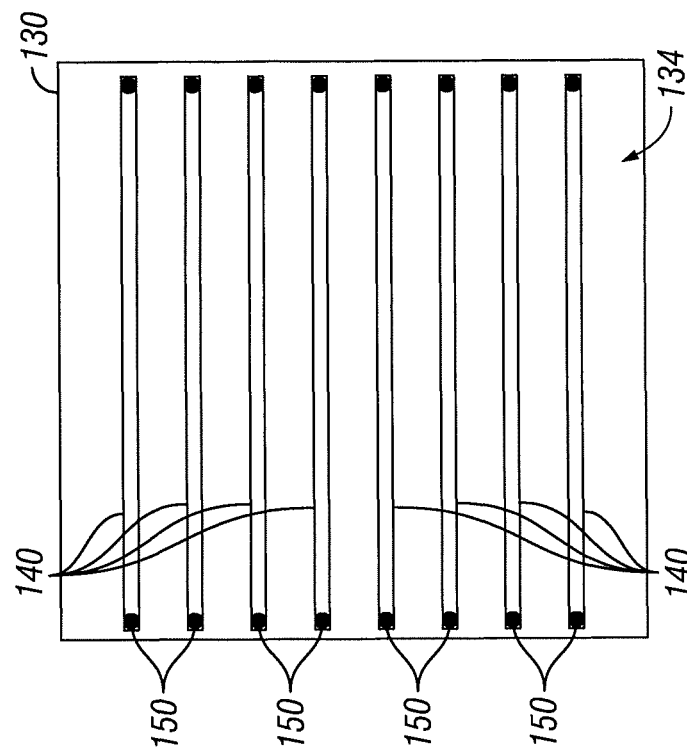
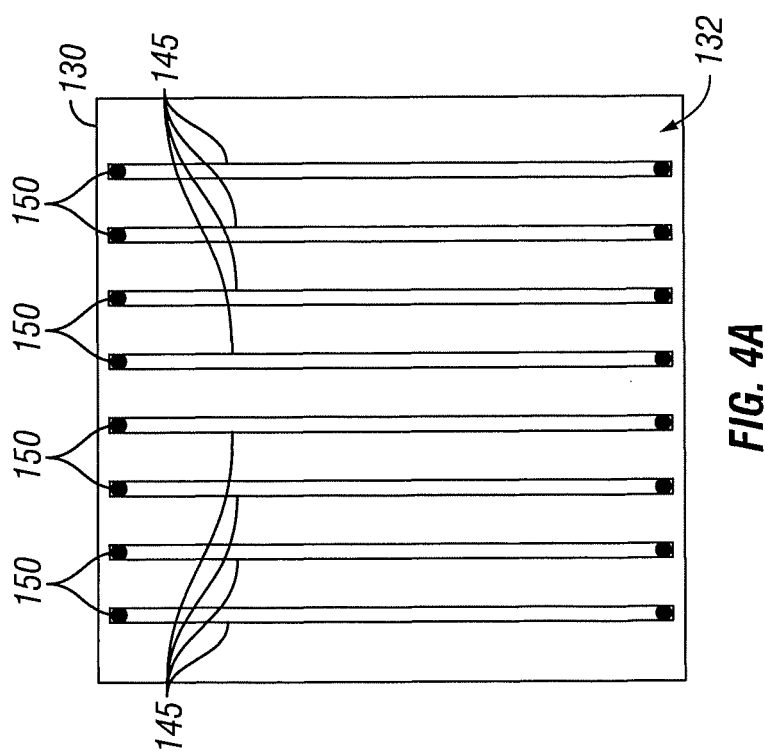
FIG. 4A
FIG. 4B

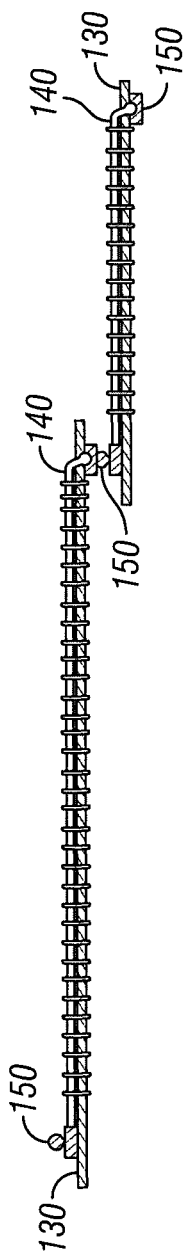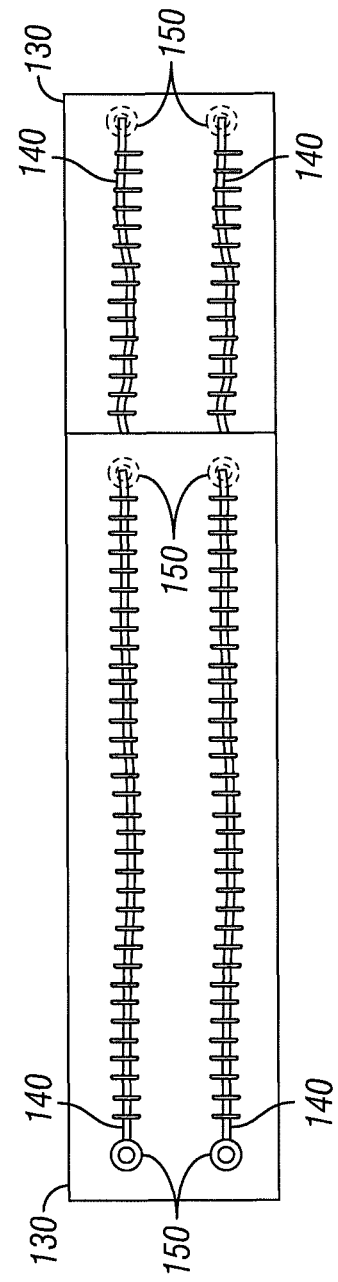
FIG. 9A
FIG. 9B

LIQUID DETECTION SYSTEM

CROSS REFERENCE TO RELATED APPLICATIONS

This application claims the benefit of U.S. Provisional Application Ser. No. 62/280,256 filed Jan. 19, 2016. Applicant incorporates by reference herein Application Ser. No. 62/280,256 in its entirety.

FIELD

Embodiments described herein relate to systems and methods for the early detection of liquids.

BACKGROUND

One of the primary goals of modern construction is to provide waterproof shelter to the occupants and property inside of a structure. There are several methods used to achieve this end. Over time, various existing waterproofing structures and methods begin to degrade. This can lead to minor water intrusion which may remain undetectable to the occupants until the problem has become significant. If water intrusion could be detected in very early stages, the problem could be remedied while it was still comparatively small and required less effort and expense to correct.

In addition to the construction of buildings and residential homes, the ability to detect leaks or other sources of liquid as they begin is very valuable across many other industries. Significant environmental damage could be avoided by early detection of leaks in a pipeline, such as an oil pipeline. Early detection of the leak would allow for proper measures to be taken before the leak becomes much larger or otherwise becomes more difficult to repair. Numerous medical, manufacturing, industrial, recreational, and transportation applications can also be readily envisioned by one of ordinary skill in the art.

SUMMARY

Embodiments of a liquid detection system detect leaks or other sources of liquid as they begin. Embodiments of the liquid detection system enable the avoidance of significant environmental damage through early detection. By incorporating a liquid detection system, all manner of liquid leaks or other sources of liquid can be detected and the owner, operator, or other pertinent personnel can be notified quickly. This facilitates resolution of the leak or other source of liquid quickly. This saves the damage and expense associated with a long-term and potentially growing leak or liquid accumulation, which may not be detected until the liquid has caused significant damage to surrounding components, structures, systems, or environment.

Embodiments of the disclosed liquid detection system generally operate by providing two conductive lines which are not in electrical communication with each other. At least one of the lines typically carries a small electrical charge. This lack of electrical communication may be because the two lines are on opposite sides of a non-conductive substrate, such as a piece of cloth, or because the lines are physically separated by a small distance. This separation can be caused by placing a piece of non-conductive material between the two lines or by arranging the lines so that there is an air-gap between them. If the wires are arranged so they are not touching, the air-gap between the lines should be sufficient to ensure that any electrical current used does not arc or "jump" across the air-gap.

When a liquid comes into contact with the system, the liquid forms an electrical bridge between the two conductive lines. This can happen either by wetting the previously dry cloth that keeps the two lines separate, or by liquid simply filling the gap between the lines. When the two conductive lines are electrically connected, this creates a detectable capacitance variation, or ultimately, a closed or "short" circuit. The conductive lines are connected, directly or indirectly, to a processor which is capable of detecting the closed circuit. Using the short circuit or capacitance variation as an indicator, the processor can send a notification to the appropriate personnel informing them of the detected liquid. In most embodiments, far more than two conductive lines will be employed, but the functioning of the system remains generally the same as the description provided above.

BRIEF DESCRIPTION OF THE DRAWINGS

FIGS. 3A-3C depict components of one embodiment of the disclosed system, namely a sensor tile, a mux piece and a CPU piece in a particular embodiment.

FIGS. 4A and 4B show an arrangement of vertical and horizontal conductive lines and connectors on opposing sides of a potential embodiment of a fabric sensor tile.

FIGS. 5A-1 and 5A-2 show a preferred configuration of conductive lines in a particular embodiment.

FIGS. 5B-1 and 5B-2 show a problematic configuration of conductive lines in a particular embodiment.

FIGS. 8A and 9B depict a preferred arrangement of connectors on a sensor tile.

FIGS. 9A and 9B depict an alternate view of a preferred arrangement of connectors on multiple sensor tiles.

DETAILED DESCRIPTION

Figure 1A:
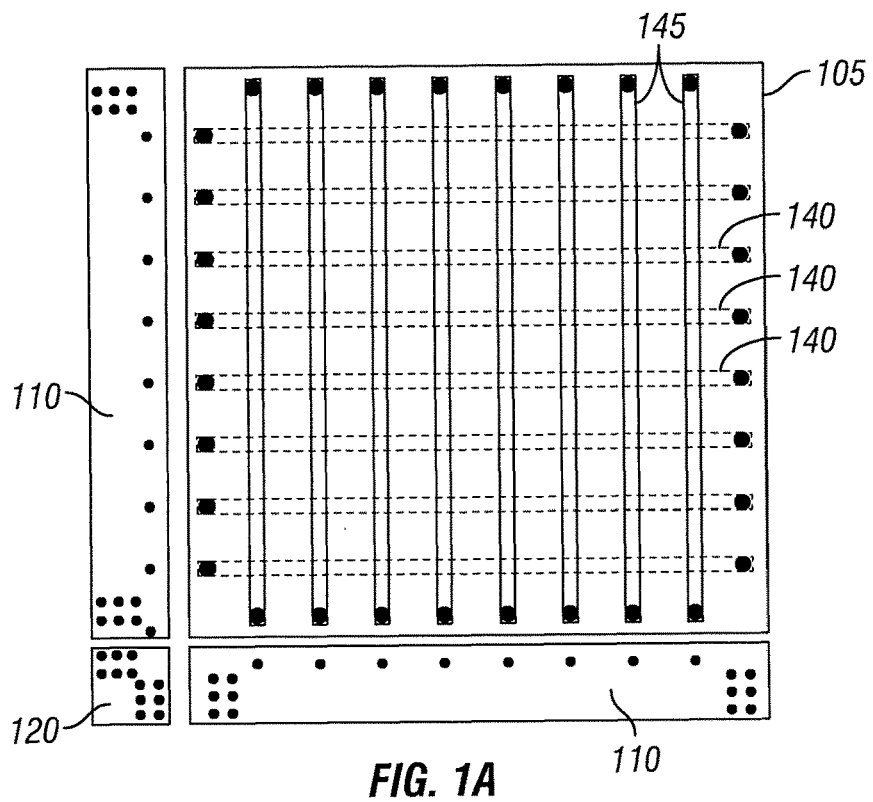
FIG. 1A depicts an overview of an embodiment of the disclosed system using a single sensor tile with conductive lines on either side.

With reference to FIG. 1A, disclosed is a system of detecting the presence of a liquid. This system may be placed on, under, or around a surface where liquid detection is desired. The system may include horizontal conductive lines 140 on a first side of a substrate 130 and vertical conductive lines 145 on a second side of a substrate 130. When liquid comes into contact with the system, the system becomes wet and may create a capacitance variation or potentially a closed circuit ("short circuit") between at least one of the horizontal conductive lines 140 from the first side of the substrate 130 and at least one of the vertical conductive lines 145 on the second side of the substrate 130. The information provided by this closed circuit may provide information related to the approximate location of the liquid. This approximate location may then be stored and/or transmitted to a user, analyst, program, database, or automated system. If a liquid causes a closed circuit across multiple horizontal conductive lines 140 and vertical conductive lines 145, in some embodiments, it may be assumed that a larger area of liquid has been detected. An alarm or notification may be scaled according to the relative size of the liquid area detected. It will be appreciated by those skilled in the art that the disclosed conductive lines 140, 145 need not be horizontal or vertical, or arranged with any particular orientation to each other in order for the system to function, although preferred embodiments may provide more precise information relating to the location of the liquid detected.

Figure 1B:
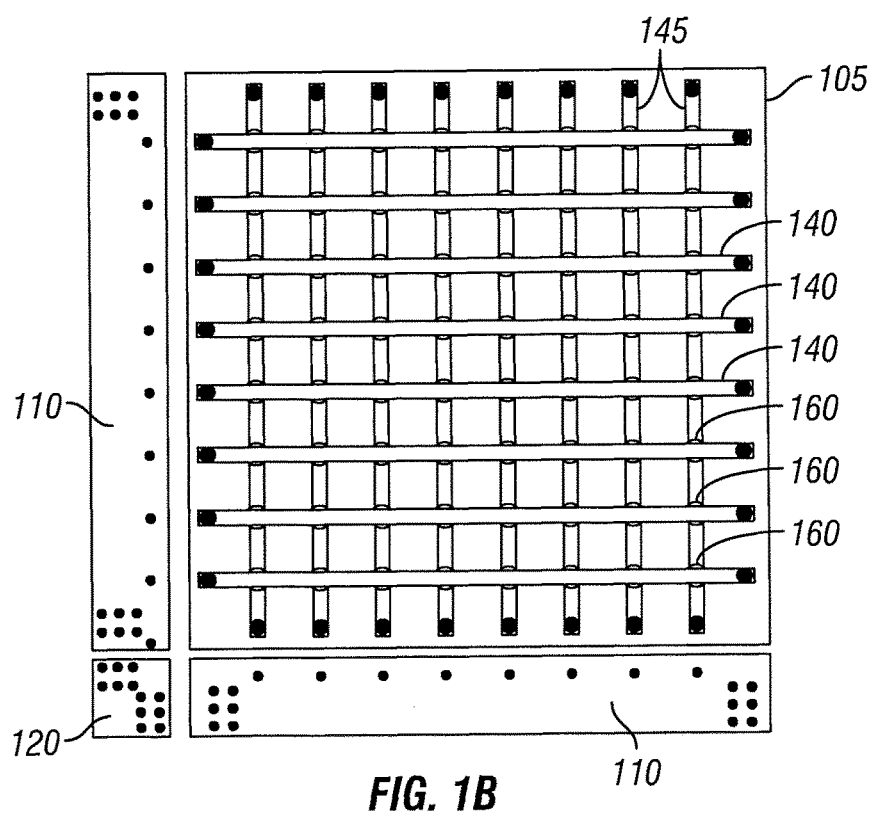
FIG. 1B depicts an overview of an embodiment of the disclosed system using a single sensor tile with two sets of conductive lines on the same side of the sensor tile.

As shown in FIG. 1B, in alternative embodiments, conductive lines 140, 145 or elements may be placed on the same side of the substrate 130. This embodiment could enable the integration of a liquid detection system and a substrate 130 comprising a leak or water-proof membrane. These embodiments would function similarly as the embodiments described above by providing small non-conductive spaces between conductive elements 140, 145 which may be electrically bridged by a liquid. These small non-conductive spaces may be created by physical separation of the conductive lines or by inserting an appropriate sized piece of any material which electrically insulates a first conductive line from a second conductive line. These insulators 160 may be any size or shape that prevents electrical communication between the conductive lines until the lines are electrically bridged by a liquid. The size, configuration, and nature of the non-conductive space will depend on the specific application.

This technology may be useful for liquid detection associated with a wide variety of surfaces, structures, and containers. Examples of useful deployments include, but are not limited to, detecting leaks in roofs, walls, floors, swimming pools, storage tanks, retention ponds, pipelines and/or tanker trucks among many others. In one potential embodiment, the system could be placed between the roofing underlayment layer and the attic insulation layer. This could be either on top of or underneath a wooden roof deck in a conventional residential roof. In many embodiments, the system will be positioned underneath a surface that may be permeated by a liquid when a liquid is present. The system need not always be placed immediately underneath the surface that may be permeated by a liquid. Those skilled in the art will appreciate that intermediate layers separating the system from the surface that may be permeated may make information regarding the location of the leak less accurate.

With reference again to FIG. 1A, a preferred embodiment of the system is typically composed of three types of pieces, at least one sensor tile 105, at least one multiplexer piece 110 ("mux") and at least one CPU piece 120. The sensor tile 105 includes conductive lines 140, 145. For clarification, a mux piece 110 is typically a processor used to convert multiple parallel signals into a single serial communication signal. The CPU piece 120 is typically a processor capable of wireless (e.g., WiFi, Bluetooth, etc.) communication or wired communication. If the CPU device detects a liquid, it may communicate that there is a leak and the approximate location of the detected leak to the end user, an operator of the system or other appropriate personnel. The CPU piece 120 may additionally contain a power source 210, such as a battery, may harvest energy in order to be self-powered (e.g., such as via solar panels) or may be connected to an external power supply. Those skilled in the art will appreciate that some embodiments of the disclosed system may incorporate the features of the sensor tile 105, mux pieces 110, and CPU piece 120 into a single piece depending on the needs of the particular application.

Figure 2:
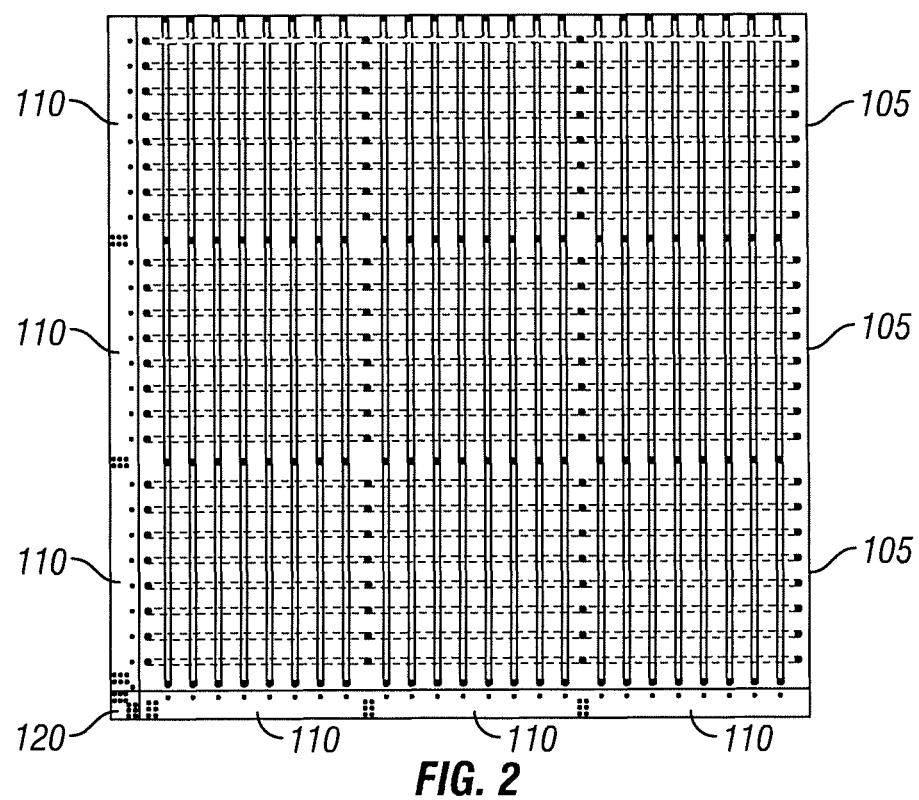
FIG. 2 depicts an embodiment of the disclosed system including a series of sensor tiles arranged in an array and inter-connected with multiple multiplexer pieces and a CPU piece.

As can be seen in FIG. 2, a combination of these three types of pieces can generate a system of substantially any shape and size. Additionally, the individual pieces may be manufactured to substantially any design specification in order to suit the desired application.

Traditionally, the area of a roof is computed in "square" units. One roofing square is equivalent to a 100 square-foot square ten feet on each side or approximately three meters on each side. In one potential embodiment, each sensor tile will be approximately equivalent to one roofing square. It will be appreciated that, in alternative embodiments, each sensor tile may be substantially any size or shape. In a preferred embodiment one sensor tile will by a square shape approximately 10 feet long and 10 feet wide. In alternative embodiments, sensor tiles may have dimensions as small as 1 foot, 3 feet, 6 inches, or even less. In other embodiments, sensor tiles may have dimensions as long as 20 feet, 50 feet, 100 feet, 500 feet, or more. Any combination of dimensions may be used to create sensor tiles that are any size of rectangle. Additionally, sensor tiles 105 may be formed into any other geometric shape such as hexagons, circles, or ellipses in order to suit the desired application. Those skilled in the art will appreciate that modifications may be necessary to the mux pieces 110 and/or CPU pieces 120 in order to accommodate alternative shapes.

In a preferred embodiment, such as the embodiment shown in FIGS. 3A-3C, the mux piece 110 is, e.g., 10 feet long in order to attach to the side of the, e.g., 10 foot long sensor tile 105 (i.e., in this embodiment, the mux piece 110 is the same length as the corresponding side of the sensor tile 105). The mux piece 110 may be approximately 1 to 6 inches wide but may be as narrow as 3 inches, 2, inches, ½ inch, ¼ inch or even narrower. This allows the mux piece 110 to be attached to the edge of a sensor time 105 in order to make the necessary electronic connections without adding significantly to the size and/or weight of the system. In this preferred embodiment, the CPU piece 120 is a square, equal in length to the width of the mux piece 110. In this embodiment, if the width of the mux piece 110 is 4 inches, the CPU piece 120 will be a square of 4 inches on each side. This allows the CPU piece 120 to be attached to two mux pieces 110 in order to received electronic information from each. The CPU piece 120 can then perform the necessary computation in order to determine the approximate location of a detected capacitance variation or short circuit based on the known location of the conductive lines 140.

Substrate Specification

Various embodiments of the substrate 130 used to create the disclosed system may have several specifications. In a preferred embodiment, the substrate 130 does not stretch significantly in any direction. In a some embodiments, the substrate 130 is designed to avoid rotting and/or to be resistant to mold growth over time. In this embodiment, the substrate 130 is, ideally, resistant to high temperatures. In a preferred embodiment, the substrate 130 is not susceptible to being eaten by bugs or pests, is not waterproof or water soluble and may additionally, or alternatively, be at least somewhat burn resistant. In a some embodiments, the substrate 130 does not degrade when in contact with spray foam insulation, fiberglass insulation, roofing underlayment or any other material commonly used in standard construction. In a preferred embodiment, the substrate 130 is fabricated from a synthetic cloth. Other potential materials for use in the substrate include, but are not limited to, natural fiber cloth, woven polymer cloth, perforated or unperforated polymer sheeting, perforated or unperforated metal sheet materials, and/or perforated, unperforated, or woven rubber materials. One skilled in the art will understand that many other materials may be suitable for use as the substrate 130 of the system depending on the desired application and that some alternative embodiments of the disclosed system will not require an integrated substrate whatsoever. In these embodiments, placement and separation of the conductive lines 140 may require additional fastening materials in order for the system to be effective and stable over the long term.

Sensor Tile Overview

FIGS. 4A and 4B show a preferred embodiment in which each sensor tile 105 is made of a piece of substrate material having a first side 132 and a second side 134. FIG. 4A shows the first side 132 of the substrate 130 has a series of relatively vertical conductive lines 145 spaced across the piece of substrate 130. FIG. 4B shows the second side 134 of substrate 130 has a series of relatively horizontal conductive lines 140 spread across the piece of substrate 130.

Each conductive line 140, 145 may be made of electrically conductive wire. One of many potential embodiments uses 22 gauge stranded aluminum or tinned copper wire. Alternate embodiments may use any conductive material including but not limited to conductive paint, carbon fiber, silver or other conductive thread, alternative gauges and materials of electrical wires, or others. In some embodiments, the conductive wire may be insulated except in locations where liquid detection is intended to occur. These locations will likely be where one conductive wire is positioned closely to a second conductive wire and the presence of a liquid is likely to electrically bridge these two wires. Using wires that are insulated for the majority of their length may cause the system to be more durable and assist with fastening the conductive wires to the substrate 130. In other embodiments, the conductive wires may be uninsulated in their entirety or only insulated for the purpose of reinforcing fastener points.

Figures 1, 5A:
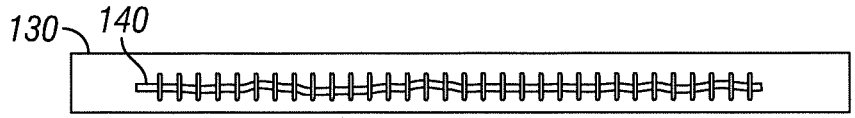
Figures 2, 5A:
Figures 1, 5B:
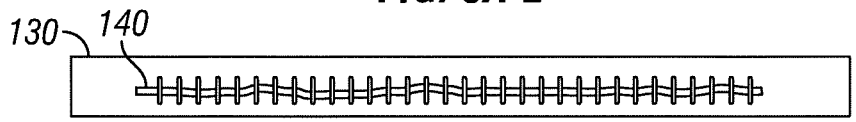
Figures 2, 5B:

FIGS. 5A-1 and 5A-2 show a preferred embodiment in which the conductive line 140 (may be conductive line 140 or 145) or other conductive element is substantially in continuous contact with the substrate 130. In many embodiments, if the conductive lines 140, 145 are predominantly or frequently not in contact with the substrate 130, as shown in FIGS. 5B-1 and 5B-2, the information regarding the location of a detected leak will be less accurate. This is because a larger area of the substrate 130 will be required to be in contact with a liquid before a closed circuit is created between two conductive lines 140, 145. If the conductive lines 140, 145 are separated by a wider space, possibly because the lines are not in constant contact with the substrate 130, the liquid that electrically connects the two lines will need to span a wider gap before it is detected.

Figure 6A:
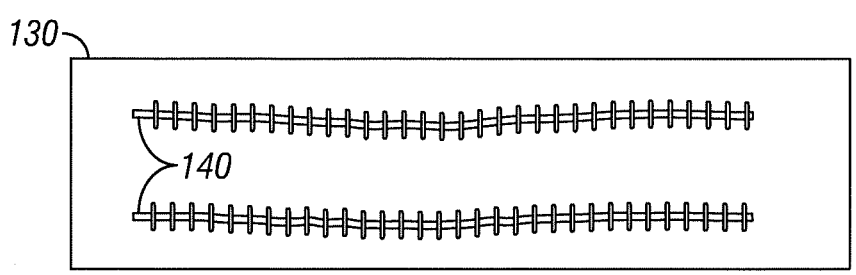
FIG. 6A shows a preferred configuration of conductive lines in a potential embodiment.
Figure 6B:
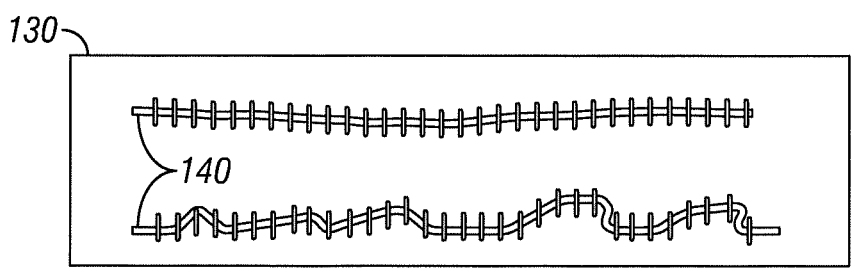
FIG. 6B shows a problematic configuration of conductive lines in a potential embodiment.

FIG. 6A shows a preferred embodiment in which the conductive lines 140 (may be conductive line 140 or 145) are as straight as possible. In this embodiment, the conductive lines 140 do not deviate outside of a one inch wide strip. Those skilled in the art will understand that in other embodiments, the conductive lines 140, 145 may be confined to a strip as small a ½ of an inch, ¼ of an inch or smaller. In other embodiments, the conductive lines 140, 145 may be confined to a strip as wide as 2 inches, 6 inches, 1 foot, 3 feet, 10 feet, or wider. As shown in FIG. 6B, if the conductive lines 140, 145 are not generally straight, additional conductive line material may be required, and the information relating to the location of a detected liquid may be less accurate than would otherwise be possible with straighter conductive lines 140, 145.

Figure 7A:
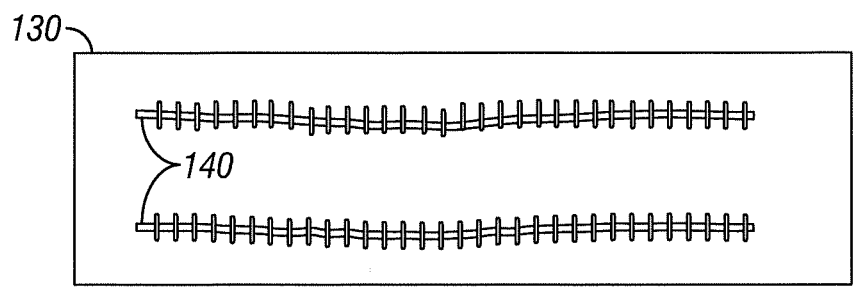
FIG. 7A shows a preferred configuration of conductive lines in a potential embodiment.
Figure 7B:
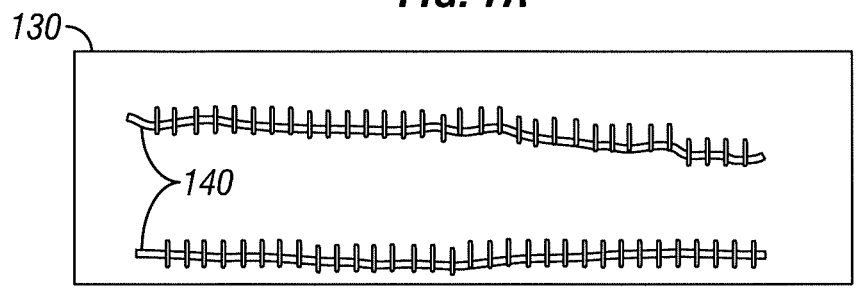
FIG. 7B shows a problematic configuration of conductive lines in a potential embodiment.

FIG. 7A shows an embodiment in which the conductive lines 140 (may be conductive line 140 or 145) are disposed on a single side of substrate 130 and are evenly spaced from one another. In this embodiment, the lines are parallel. In a preferred embodiment, the conductive lines 140, 145 may be spaced approximately 6 inches from each other. The spacing between conductive lines 140, 145 may be altered in order to suit each particular application. In some embodiments, the lines may be spaced as little as 3 inches, 1 inch, ½ inch or even less from each other. In other embodiments, the lines may be spaced as much as 1 foot, 3 feet, 10 feet, or further from each other. FIG. 7B shows an embodiment in which the lines are not parallel (or are irregularly parallel). This may reduce the accuracy of the location related information. However, the conductive lines 140, 145 may be arranged in any configuration depending on the desired application.

In some embodiments, the conductive lines 140, 145 may be printed directly onto the substrate 130 or incorporated into the substrate 130 itself. This may facilitate producing rolls of leak detection cloth as opposed to individual sensor tiles 105. Large rolls of leak detection cloth may be designed as a single large sensor tile 105 which is to be connected to appropriately sized MUX pieces 110 and a CPU piece 120. Rolls of leak detection cloth may also be designed as an integrated system with at least one, and preferably two mux pieces 110 and a CPU piece 120 integrated into the same piece of substrate 130. In embodiments which print the conductive lines 140, 145 directly onto the substrate, conductive paint, tape, polymers or similar conductive materials may be used. In embodiments in which the conductive lines 140, 145 are directly integrated into the substrate 130 silver thread or other conductive thread may be woven into the substrate cloth. Additionally, these materials may be electrically insulated or otherwise protected except at the locations which are necessary for forming a completed circuit between a first set of conductive lines 140, 145 and a second set of conductive lines 140, 145.

Sensor Tile Connectors

Figure 8A:
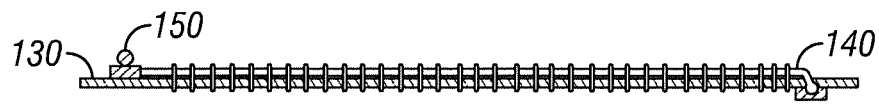
Figure 8B:
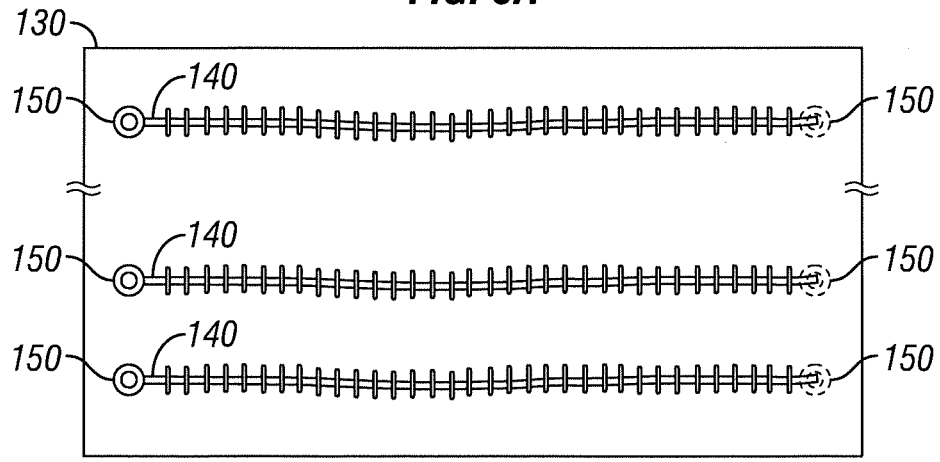

With reference to FIGS. 8A and 8B, connectors 150 may be used to connect multiple sensor tiles 105. These connectors 150 are preferably snap type connectors but may use any electronically conductive connection. These connectors 150 allow multiple sensor tiles 105 to be modularly connected to form an array of sensor tiles in substantially any size or shape. The connector material is conductive. In preferred embodiments, the connector material does not oxidize over time as oxidation may result in a decrease or loss of conductivity. In embodiments which employ connectors 150, the conductive lines 140, 145 are electronically connected to the connectors 150 so that the closed circuit signal from the conductive lines 140, 145 may be passed to the mux piece 110 and then the CPU piece 120. This may be accomplished by soldering the conductive wires to the connectors 150 or using any other appropriate form of electronically conductive connection. In some embodiments, connectors will not be necessary. This is particularly true in fully integrated embodiments of the disclosed system in which all of the necessary conductive and electronic components are integrated into a single substrate.

FIGS. 8A and 8B show a portion of a sensor tile 105 with both male and female snap-type connectors 150. Each sensor tile 105 may be connected to an adjoining piece using the described snap connectors 150. This will often result in a slight overlap of substrates pieces as can be seen in FIGS.

9A and 9B. In the modular embodiments, an individual conductive wire 140, 145 will typically be connected to two snap connectors 150, one at each end of the sensor tile 105. The snap connectors 150 connected to each conductive line 140, 145 will typically be arranged at opposite ends of the sensor tile 105. This arrangement allows the sensor tiles 105 to be modular so that a sensor tile 105 may be used in substantially any location within a large array. Depending on the application, the connectors 150 may all be placed on a particular side of the substrate 130 or the connectors 150 may be placed on a first side of the substrate 130 at one end and on the opposite side of the substrate 130 at the other end. This format will allow module sensor tiles 105 to be easily laid on top of one another. Additionally, any arrangement of male and female snap connectors 150 may be used. Placing all male connectors 150 at one end of the substrate and all female connectors 150 at the other end of the substrate may simplify installation of the modular sensor tiles. Alternating male and female connectors 150 on each end of the substrate may alternatively assist in ensuring that the modular sensor tiles 105 are properly aligned for certain applications.

Alternative embodiments of the disclosed system may include using two separate pieces of cloth as a substrate 130. Each piece of cloth may contain a single row of conductive lines 140 on only one side. When the two pieces are joined, possibly using an adhesive or stitching, they may form a single sensor tile 105. The first cloth section may be oriented at 90 degrees relative to the second cloth section. In effect, this creates a similar arrangement as attaching horizontal conductive lines 140 to a first side of a sensor tile 105 and vertical conductive lines 145 to a second side of the same sensor tile 105. One skilled in the art will understand that the conductive lines 140, 145 are arranged so that they are not electrically connected with one another until the circuit is closed by the presence of a liquid. In this embodiment, an intermediate layer may be placed in between the two cloth sections in order to regulate various properties of the system. Such intermediate layers may include perforated or selectively permeable layers which may allow for the detection of certain liquids while excluding others. The degree of permeability of the intermediate layer could be used to modulate the sensitivity of the system or control for a wide variety of factors.

Embodiments disclosed herein relate to a system for detecting the presence of a liquid, the system comprising a first plurality of conductive lines and a second plurality of conductive lines, wherein the first plurality of conductive lines is electrically insulated from the second plurality of conductive lines until the lines are electrically connected by a liquid. The system further comprises a processor operably connected to the first and second pluralities of conductive lines, the processor configured to detect when an electrical connection is formed between any of the conductive lines. Embodiments may also comprise a substrate, wherein the first and second pluralities of conductive lines are attached to the substrate. In some embodiments, the substrate has a first and second side and the first plurality of conductive lines is attached to a first side of the substrate and the second plurality of conductive lines is attached to a second side of the substrate. In some embodiments, the first plurality of conductive lines are disposed at between about a 45 and 135 degree angle relative to the second plurality of conductive lines. The system may further comprise at least one multiplexer, wherein the first plurality of conductive lines is operably connected to the multiplexer and the multiplexer is operably connected to the processor. In some embodiments, the conductive lines are painted onto the substrate, while in other embodiments, the conductive lines are integrated into the substrate. In some embodiments the processor is configured to determine the type of liquid present based on the electrical properties of the liquid. The system may also comprise a self-contained power source such as a battery, solar panel, or other device useful for powering the system that is not connected to an external power source. In some embodiments, the substrate is a waterproof membrane or the substrate may be perforated. In additional embodiments, the substrate is designed to be wrapped around a substantially cylindrical pipe. In still more embodiments, the substrate is at least 100 square feet in area.

Disclosed embodiments of relate to a system for detecting the presence of a liquid, the system comprising a sensor tile, wherein the sensor tile comprises a sensor tile substrate, wherein the sensor tile substrate has a first side, a second side, and at least a first edge and a second edge. The sensor tile further comprises a first plurality of conductive lines operably connected to connectors located substantially at the first edge of the sensor tile substrate, a second plurality of conductive lines operably connected to connectors located substantially at the second edge of the sensor tile substrate, wherein the first plurality of conductive lines is attached to the first side of the sensor tile substrate and the second plurality of conductive lines attached to the second side of the sensor tile substrate, and wherein the first plurality of conductive lines is electrically insulated from the second plurality of conductive lines until the lines are electrically connected by a liquid. The system further comprises a first multiplexer, and a second multiplexer, wherein the first multiplexer is operably connected to the connectors located substantially at the first edge of the sensor tile substrate and the second multiplexer is operably connected to the connectors located at the second edge of the sensor tile substrate. The system also comprises a processor, wherein the process is operably connected to the first and second multiplexer and wherein the processor is configured to detect when an electrical connection is formed between any of the conductive lines in the first plurality of conductive lines and any of the conductive lines in the second plurality of conductive lines. In some embodiments, the sensor tile is configured to be operably connected to other sensor tiles in order to form an array. In additional embodiments, the sensor tile substrate is a woven cloth.

Still more disclosed embodiments may relate to a system for detecting the presence of a liquid, the system comprising at least one sensor tile, wherein each sensor tile includes a first plurality of conductive lines attached to a first side of a substrate and a second plurality of conductive lines attached to a second side of a substrate, the first and second plurality of conductive lines configured to be electrically insulated from each other until connected by a liquid in physical contact with both the first and second plurality of conductive lines, and at least one processor operably connected to the first and second plurality of conductive lines. Embodiments of this system may further comprise a plurality of sensor tiles operably connected and arranged into an array. In some embodiments, each sensor tile is approximately a square ten feet on each side.

The terms and descriptions used herein are set forth by way of illustration only and are not meant as limitations. Those skilled in the art will recognize that many variations are possible within the spirit and scope of the invention as defined in the following claims, and their equivalents.

What is claimed is:
1. A sensor tile system for detecting the presence of a liquid, the system comprising:

at least one sensor tile that may be used for a roofing material for a structure, the sensor tile including:
a first plurality of conductive lines;
a second plurality of conductive lines, wherein the first plurality of conductive lines is electrically insulated from the second plurality of conductive lines until the lines are electrically connected by a liquid;
a substrate, wherein the first and second pluralities of conductive lines are attached to the same side of the substrate, and
insulators which electrically insulate the conductive lines from each other until the lines are electrically bridged by a liquid, wherein the insulators are positioned in between the first and second pluralities of conductive lines where the lines intersect.

2. A system for detecting the presence of a liquid, the system comprising:
a plurality of sensor tiles connected to form an array, wherein each sensor tile comprises
a sensor tile substrate, wherein the sensor tile substrate has a first side, a second side, and at least a first edge and a second edge;
a first plurality of conductive lines operably connected to connectors located substantially at the first edge of the sensor tile substrate;
a second plurality of conductive lines operably connected to connectors located substantially at the second edge of the sensor tile substrate, wherein the first plurality of conductive lines is attached to the first side of the sensor tile substrate and the second plurality of conductive lines attached to the second side of the sensor tile substrate, and wherein the first plurality of conductive lines is electrically insulated from the second plurality of conductive lines until the lines are electrically connected by a liquid;
a first multiplexer;
a second multiplexer, wherein the first multiplexer is operably connected to the connectors located substantially at the first edge of at least one sensor tile substrate and the second multiplexer is operably connected to the connectors located at the second edge of at least one sensor tile substrate; and
a processor, wherein the processor is operably connected to the first and second multiplexer and wherein the processor is configured to detect when an electrical connection is formed between any of the conductive lines in the first plurality of conductive lines and any of the conductive lines in the second plurality of conductive lines.

3. The system of claim 2, wherein the array of sensor tiles is operably connected to a network and provides processor outputs indicating detection of a liquid by the array to the network.

* * * * *